United States Patent [19]

Miller

[11] 4,365,232

[45] Dec. 21, 1982

[54] EMERGENCY LIGHTING UNIT

[75] Inventor: George R. Miller, Indianapolis, Ind.

[73] Assignee: The United States of America as represented by the Secretary of the Navy, Washington, D.C.

[21] Appl. No.: 246,781

[22] Filed: Mar. 23, 1981

[51] Int. Cl.³ .......................... G08B 5/36; G08B 21/00
[52] U.S. Cl. ...................................... 340/27 R; 362/62
[58] Field of Search .................... 362/20, 62, 63, 457, 362/802; 340/25, 27 R, 28, 52 H

[56] References Cited

U.S. PATENT DOCUMENTS

| | | | |
|---|---|---|---|
| 2,679,578 | 5/1954 | Hanger | 240/51.11 |
| 2,721,255 | 10/1955 | Lanmon | 240/2 |
| 3,131,871 | 5/1964 | Foulds | 240/2 |
| 3,331,958 | 7/1967 | Adler | 240/10.6 |
| 3,411,131 | 11/1968 | Hewes | 340/27 |
| 3,428,941 | 2/1969 | Hewes | 340/27 |
| 3,619,600 | 11/1971 | Kryder | 240/11.4 |
| 3,868,630 | 2/1975 | Lesondak | 340/119 |
| 4,161,769 | 7/1979 | Elliott | 362/146 |

Primary Examiner—Thomas A. Robinson

[57] ABSTRACT

An emergency lighting unit having a electroluminescent lamp is provided for use in locating an aircraft exit. The emergency lighting unit contains a battery and an inverter for converting DC battery current to high frequency alternating current required for illumination of the electroluminescent lamp. Various means are provided for automatically lighting the lamp during a distress situation. The lighting unit is configured to serve as a handle for use in leaving a disabled aircraft.

2 Claims, 6 Drawing Figures

EMERGENCY LIGHTING UNIT

BACKGROUND OF THE INVENTION

The present invention relates to an emergency lighting unit and more particularly to an emergency lighting unit for use in making exits in an aircraft, such as a helicopter.

In general, military helicopters do not have any interior lights which mark exits or escape hatches. Investigation of crashes of helicopters, and particularly helicopters operated by the Navy, disclose that many crashes occur in water and that usually the crashed helicopter will invert due to its high center of gravity. An upside down position coupled with an inrush of water and other debris, makes it most difficult to leave a sinking helicopter, particularly when the doors and hatches are not visible. Evacuation must be done in a very short period of time if those in the cabin are to avoid drowning.

The necessity of providing some type of emergency lighting has been realized and some attempts have been made to provide such lighting. For example, two U.S. Pat. Nos. (3,411,131 and 3,428,941) have been issued to Basil V. Hewes, which relate to a combination signaling device for would-be rescuers and to an inside illuminating device for assisting evacuation. In order to provide a visual indicator to both the outside and inside of the aircraft, a lamp is positioned between the inner and outer walls of the fuselage.

SUMMARY OF THE INVENTION

The present invention relates to an emergency lighting unit for use in marking doors and other exits in an aircraft, such as a helicopter, in order to facilitate evacuation in the event of a crash. The unit is comprised of an electroluminescent lamp which is supported in a translucent cover, and a battery and an inverter are provided to supply high frequency alternating current required for illumination of the electroluminescent lamp. The lighting unit is filled with a semi-rigid foam material which provides added strength so that the unit can also serve as a handle. Various means are provided for turning on the lamp, including a manually operated switch. The lamp might also be lighted by sensors such as an impact sensor, attitude sensor and a water sensor, which can detect a distress situation.

It is therefore a general object of the present invention to provide an emergency light for marking an aircraft exit.

Another object of the present invention is to provide an emergency light which is self-contained and operates independently from aircraft power.

Still another object of the present invention is to provide a light for marking aircraft exits which can be either manually or automatically operated.

Another object of the present invention is to provide an emergency lighting unit designed and constructed to be placed near an aircraft exit to serve as both a light and a handle to assist in evacuation.

Other objects, advantages and novel features of the present invention will become apparent from the following detailed description of the invention when considered in conjunction with the accompanying drawings.

DESCRIPTION OF THE PREFERRED EMBODIMENT

Figure 1:
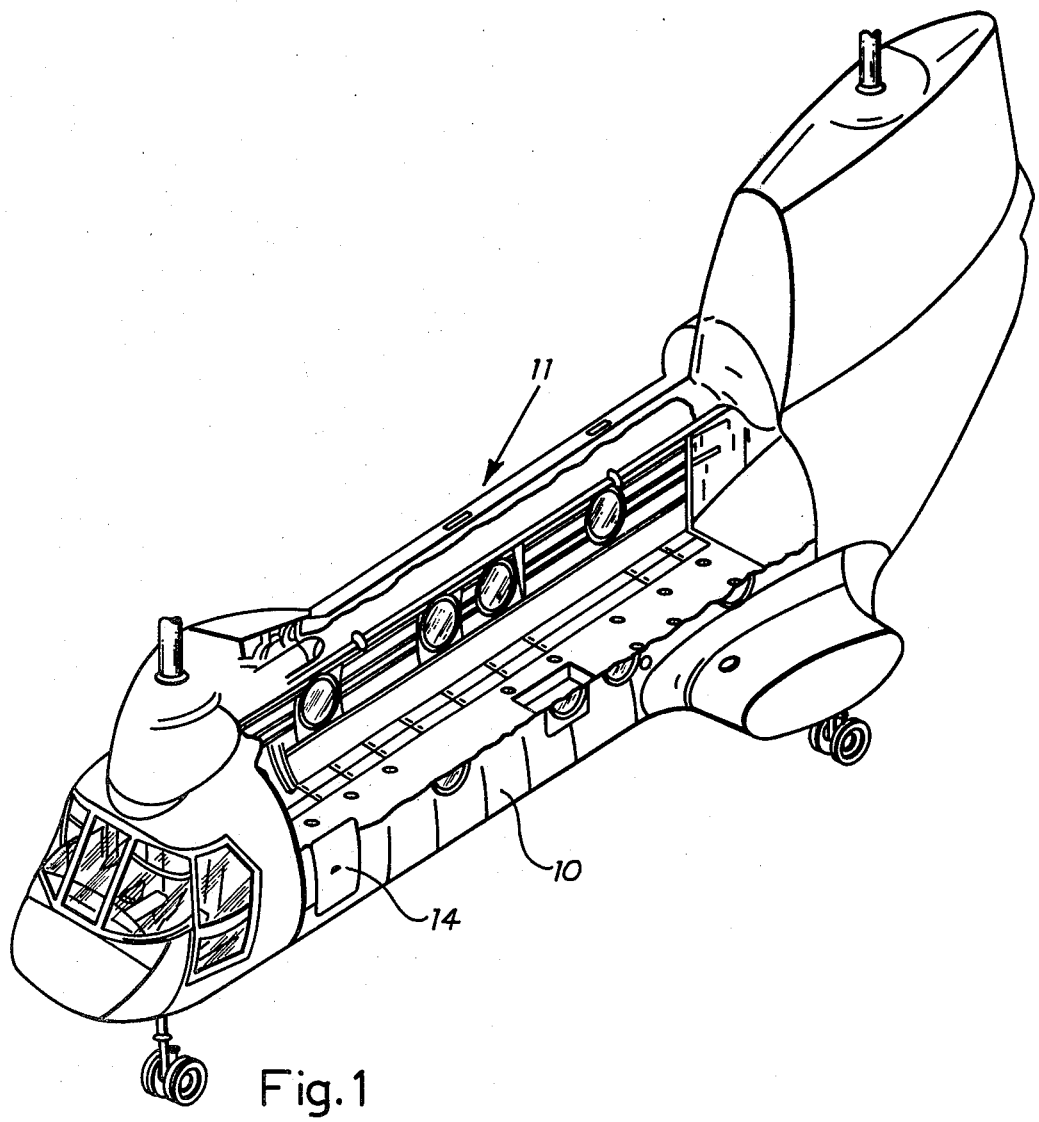
FIG. 1 is a perspective view, partly broken away, showing windows, doors and escape hatches in a helicopter.
Figures 2, 5:
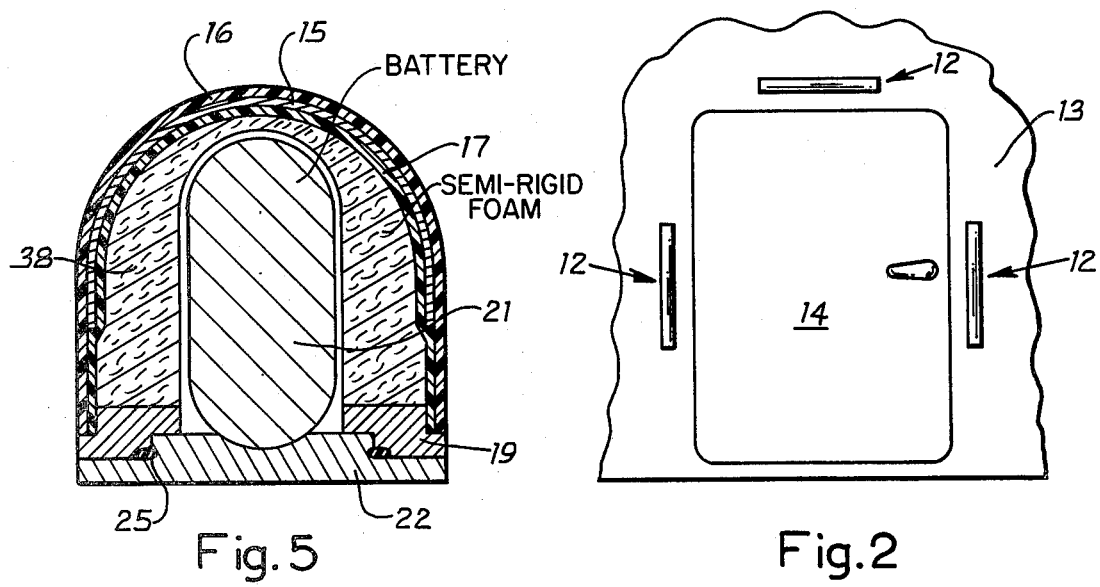
FIG. 2 is a partial view of a helicopter fuselage showing emergency lighting units placed by a door.
FIG. 5 is a sectional view taken on line 5—5 of FIG. 4.

Referring now to the drawings, FIG. 1 illustrates that various windows, doors and escape hatches are provided in the fuselage 10 of a helicopter 11; however, in military aircraft these doors and hatches are not marked with illuminated "exit" signs. When a military helicopter is ditched into water, it will usually invert due to a high center of gravity, and location of doors and escape hatches is extremely difficult. FIG. 2 of the drawings shows three emergency lighting units 12 mounted on a bulkhead 13 of an aircraft and positioned near a door 14 to help locate door 14 in a darkened environment. Lighting units 12 are normally in an off condition; however, as will be hereinafter described, various means are provided for energizing lighting units 12 in the event of a crash.

Figure 3:
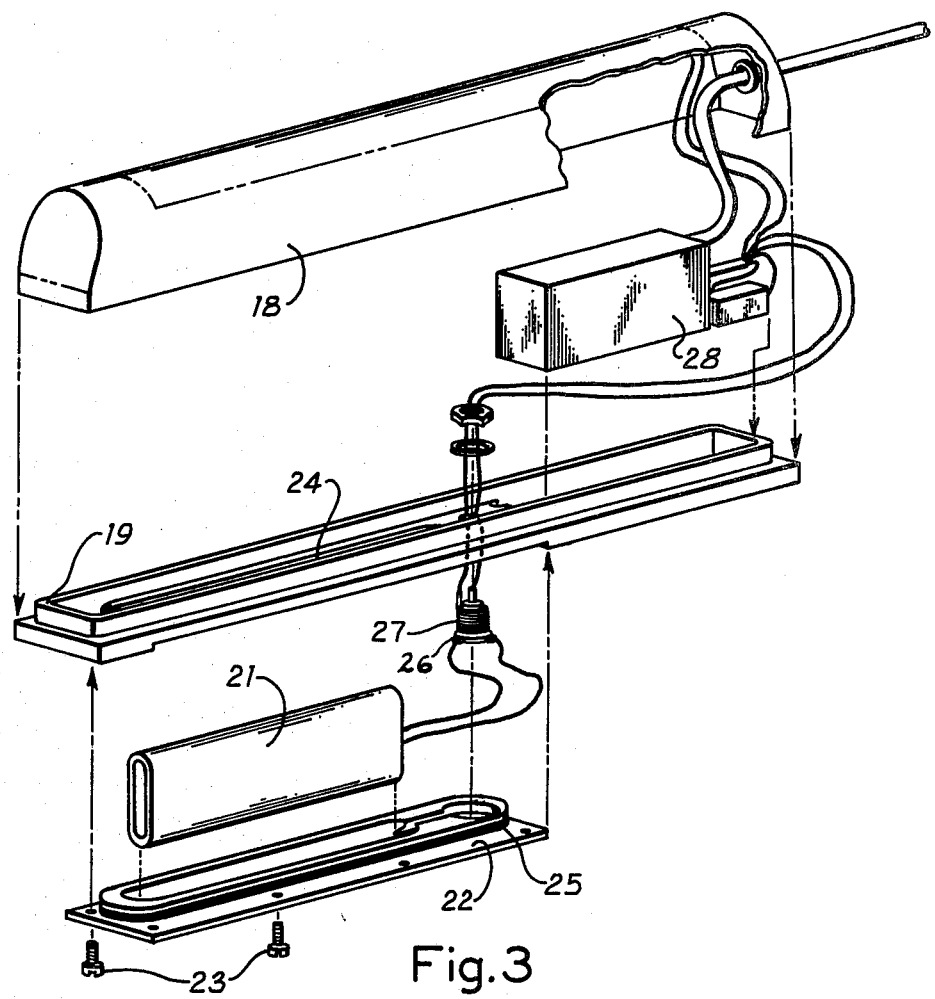
FIG. 3 is an exploded view of a preferred embodiment of the present invention.
Figure 4:
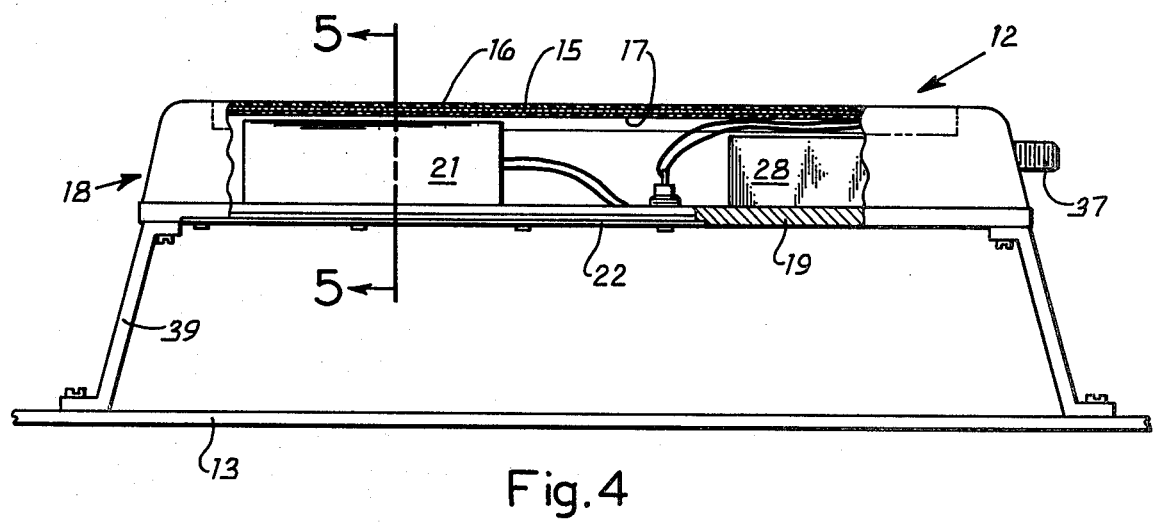
FIG. 4 is a side view, partly broken away, showing a preferred embodiment of the present invention mounted on support brackets.

Referring now to FIGS. 3, 4, and 5 of the drawings, there is shown a preferred embodiment of the present invention. Lamp 15 is an electroluminescent lamp which is a "cold" light source operating close to ambient temperature. An electroluminescent lamp is comprised of a dielectric between two conducting surfaces. A luminescent pigment, such as phosphor particles, is commonly dispersed within the insulator, and current flows within the semiconducting, phosphor particles embedded in the insulator, due to a changing electric field. An electroluminescent lamp operates exclusively on alternating current and the induced current gives rise to "luminescense", a term employed to describe those phenomena of light emission not due to the temperature of the source. Lamp 15 is flexible and is supported between an outer layer 16 and an inner layer 17 of translucent material, such as fiberglass, and outer layer 16 and inner layer 17 are formed to provide a cover 18 for lighting unit 12.

A base 19 of relatively strong, but light material, such as aluminum, is provided to support the light components and cover 18 is attached to base 19, as by bonding with a waterproof adhesive. Base 19 also serves as a heat sink. As each lighting unit is self-sufficient, a DC battery pack 21 is provided, and in order to facilitate replacement, battery pack 21 is attached to cover plate 22 which is attachable by screws 23 to base 19. As best shown in FIG. 3 of the drawings, base 19 is provided with an aperture 24 through which battery pack 21 can extend, and a gasket 25 provides a waterproof seal between base 19 and cover plate 22. Mating connector elements 26 and 27 are provided to facilitate rapid battery replacement. Connector element 26 is attached to cover plate 22 and connector element 27 is attached to base 19. As lamp 15 operates on alternating current, an inverter is provided within module 28 to convert the DC current from battery 21 to the high frequency alternating current required for illumination of lamp 15. Module 28 also contains a control circuit which, upon receiving a signal, causes battery 21 to energize lamp 15 through the DC to AC inverter.

Figure 6:
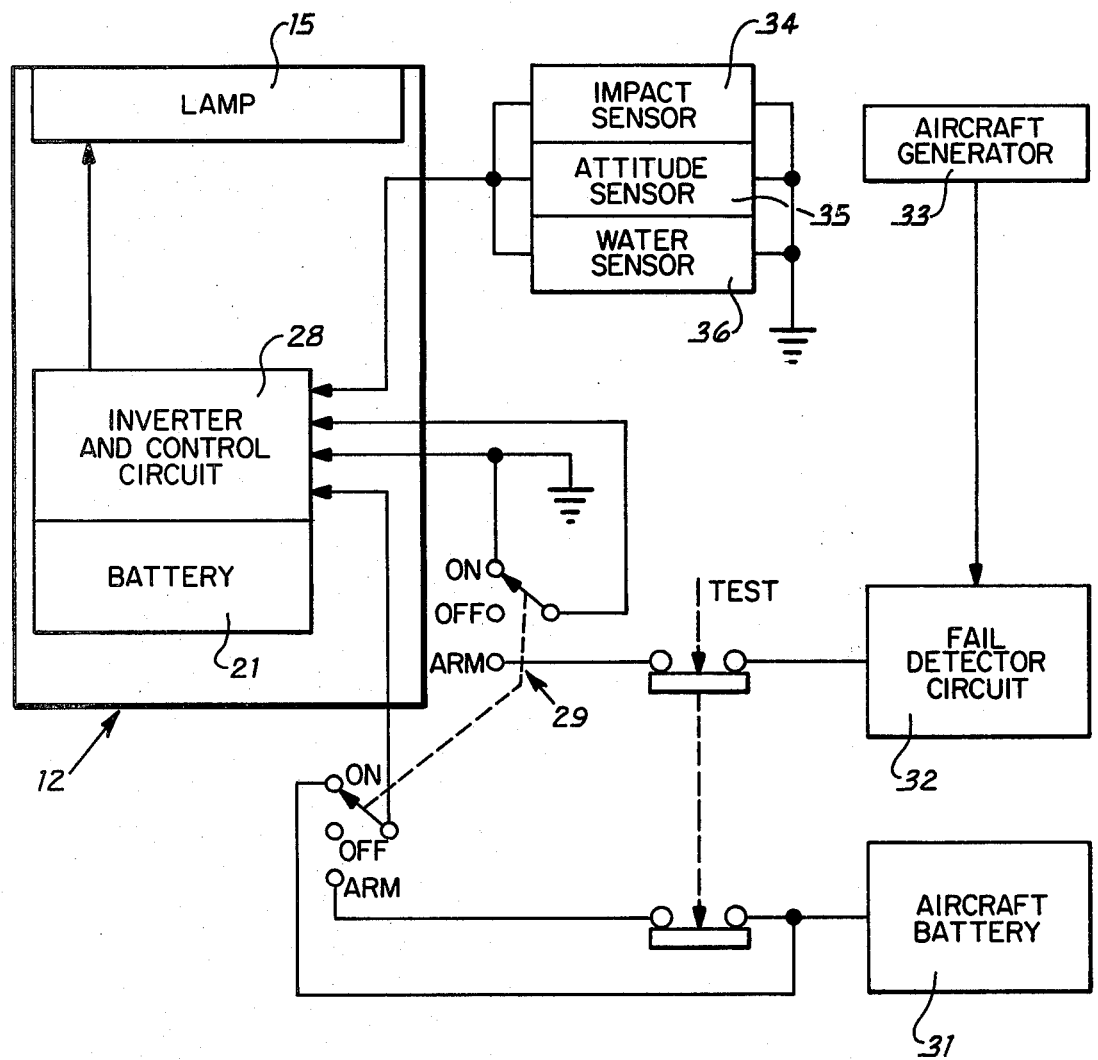
FIG. 6 is a schematic view showing means for closing a circuit for energizing an emergency lighting unit.

Referring now to FIG. 6 of the drawings, various arrangements are shown for turning on lamp 15. Switch 29 provides various operating modes. When the helicopter is not flying, switch 29, which is operable by a pilot or a crew chief is placed in the "OFF" position. During flight check, switch 29 can be moved to the "ARM" position which connects one module 28 lead with aircraft battery 31. Another module lead is connected with fail detector circuit 32 which monitors aircraft generator 33. As generators on a helicopter are driven by the rotor, loss of rotor power causes a corresponding loss of voltage from the generator and this condition indicates a possible crash, and lamp 15 would be illuminated. Also, a pilot or a crew chief can move switch 29 to an "ON" position to immediately light lamp 15 when an emergency situation is imminent. In the event that an aircraft battery is connected to a lamp 15, current from this source is first used for illuminating lamp 15 but, in the event that no aircraft battery power is available, battery 21 will illuminate lamp 15. Other sensors, such as an impact sensor 34, attitude sensor 35 and a water sensor 36 might be used to indicate a distress situation, and cause lamp 15 to be illuminated. As best shown in FIG. 4 of the drawings, a connector 37 is provided on one end of cover 18 and is used to electrically connect the sensing and detecting elements with module 28.

Referring again to FIGS. 4 and 5 of the drawing, the unoccupied space between base 19 and cover 18 is filled with a semi-rigid foam material 38 which strengthens the assembly so that it can serve as a handle. Mounting of lighting unit 12 by a pair of standoff brackets 39 also facilitates the use of the lighting unit 12 as a holding device.

It can thus be seen that the present invention provides a self-sufficient lighting unit which can readily be fitted to existing aircraft without major modification to the aircraft.

Obviously many modifications and variations of the present invention are possible in the light of the above teachings. It is therefore to be understood that the invention may be practiced otherwise than as specifically described.

I claim:

1. In an aircraft, at least one emergency lighting unit mounted to a bulkhead by standoff brackets to serve as an evacuation light and a handle, said lighting unit comprising,
   a casing formed by a flat metallic heat sink and a translucent cover,
   an electroluminescent lamp fixed to said translucent cover,
   alternating current means within said casing for illuminating said electroluminescent lamp, and
   circuit means for connecting said alternating current means to said electroluminescent lamp.

2. An emergency lighting unit as set forth in claim 1 wherein said alternating current means includes a battery and an inverter for converting DC current from said battery to high frequency alternating current.

* * * * *